(12) United States Patent
Delevati (10) Patent No.: US 11,780,979 B2
(45) Date of Patent: Oct. 10, 2023

(54) VERY SOFT EVA FOAM AND METHODS THEREOF

(71) Applicant: Braskem S.A., Camaçari (BR)

(72) Inventor: Giancarlos Delevati, São Paulo (BR)

(73) Assignee: Braskem S.A., Camaçari (BR)

( * ) Notice: Subject to any disclaimer, the term of this patent is extended or adjusted under 35 U.S.C. 154(b) by 243 days.

(21) Appl. No.: 17/018,790

(22) Filed: Sep. 11, 2020

(65) Prior Publication Data

US 2021/0070956 A1    Mar. 11, 2021

Related U.S. Application Data

(60) Provisional application No. 62/898,912, filed on Sep. 11, 2019.

(51) Int. Cl.
| | | |
|---|---|---|
| *C08J 9/10* | (2006.01) | |
| *C08K 3/22* | (2006.01) | |
| *C08J 9/00* | (2006.01) | |
| *C08K 5/14* | (2006.01) | |

(52) U.S. Cl.
CPC ............. *C08J 9/0061* (2013.01); *C08J 9/103* (2013.01); *C08K 3/22* (2013.01); *C08K 5/14* (2013.01); *C08J 2307/00* (2013.01); *C08J 2331/04* (2013.01); *C08J 2423/08* (2013.01); *C08J 2431/04* (2013.01); *C08J 2483/04* (2013.01); *C08K 2003/2296* (2013.01)

(58) Field of Classification Search
CPC ...... C08J 9/0061; C08J 9/103; C08J 2307/00; C08J 2331/04; C08J 2423/08; C08J 2431/04; C08J 2483/04; C08J 2201/026; C08J 2203/04; C08J 2407/00; C08J 2205/06; C08J 2323/08; C08K 3/22; C08K 5/14; C08K 2003/2296; C08L 23/0853

See application file for complete search history.

(56) References Cited

U.S. PATENT DOCUMENTS

| | | |
|---|---|---|
| 4,396,789 A | 8/1983 | Barrocas et al. |
| 5,840,971 A | 11/1998 | Gubelmann-Bonneau |
| 9,181,143 B2 | 11/2015 | do Carmo et al. |
| 2003/0078309 A1 * | 4/2003 | Koffler .................. C08J 9/0023 521/79 |
| 2017/0181498 A1 | 6/2017 | Whelan et al. |
| 2019/0136006 A1 | 5/2019 | Rodrigues Camilo et al. |
| 2019/0315948 A1 | 10/2019 | Delevati et al. |
| 2019/0315949 A1 | 10/2019 | Delevati et al. |

FOREIGN PATENT DOCUMENTS

| | | | | |
|---|---|---|---|---|
| CN | 107722442 A | 2/2018 | | |
| WO | WO-2014053037 A1 * | 4/2014 | ............ | A43B 13/04 |
| WO | 2016014230 A1 | 1/2016 | | |
| WO | 2016/94161 A1 | 6/2016 | | |
| WO | 2018/112593 A1 | 6/2018 | | |
| WO | 2019111047 A1 | 6/2019 | | |
| WO | 2019202406 A1 | 10/2019 | | |

OTHER PUBLICATIONS

Braskem EVA VA1518A, 2018 (Year: 2018).*
Green EVA SVT2180, Omnexus brochure, 2020 (Year: 2020).*
Green EVA Evance SVT2145R, 2018 (Year: 2018).*
International Preliminary Report on Patentability issued in International Application No. PCT/IB2020/020052, dated Mar. 24, 2022 (8 pages).
X. Li et al. "Selective Catalytic Oxidation of Ethanol to Acetic Acid on Dispersed Mo—V—Nb Mixed Oxides" Chemistry A European Journal, 2007, 13, 9324-9330 (7 pages).
B. Jones et al. "The Production of Vinyl Acetate Monomer as a Co-Product from the Non-Catalytic Cracking of Soybean Oil" Processes, 3, Aug. 14, 2015 pp. 619-633 (15 pages).
N. Saichana et al. Abstract of "Acetic acid bacteria: A group of bacteria with versatile biotechnological applications" Biotechnology Advances, vol. 33, Issue 6, part 2, Nov. 1, 2015 (2 pages).
P. Raspor et al., "Biotechnological Applications of Acetic Acid Bacteria", Critical Reviews in Biotechnology, vol. 28, 2008, pp. 101-124 (26 pages).
International Search Report issued in International Application No. PCT/IB2020/020052, dated Nov. 11, 2020 (4 pages).
Written Opinion issued in International Application No. PCT/IB2020/020052, dated Nov. 11, 2020 (8 pages).

\* cited by examiner

*Primary Examiner* — Irina S Zemel
(74) *Attorney, Agent, or Firm* — Osha Bergman Watanabe & Burton LLP (57) ABSTRACT

A polymer composition may include an ethylene vinyl acetate (EVA) polymer at an amount ranging from 10 to 90 phr; an elastomeric EVA composition at an amount ranging from 10 to 90 phr; a plasticizer at an amount ranging from 5 to 40 phr; a blowing agent in an amount ranging from 2 to 10 phr; and a peroxide in an amount ranging from 0.3 to 4 phr.

12 Claims, 1 Drawing Sheet

VERY SOFT EVA FOAM AND METHODS THEREOF

BACKGROUND

Polyolefin copolymers such as ethylene vinyl acetate (EVA) may be used to manufacture a varied range of articles, including films, molded products, foams, and the like. In general, polyolefins are widely used plastics worldwide, given their versatility in a wide range of applications. EVA may have characteristics such as high processability, low production cost, flexibility, low density and recycling possibility. However, EVA compositions generally do not have a combination of density and hardness that enables their use in the production of articles that are required to have a very soft touch.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to polymer compositions that include an ethylene vinyl acetate (EVA) polymer at an amount ranging from 10 to 90 phr; an elastomeric EVA composition at an amount ranging from 10 to 90 phr; a plasticizer at an amount ranging from 5 to 40 phr; a blowing agent in an amount ranging from 2 to 10 phr; and a peroxide in an amount ranging from 0.3 to 4 phr.

In another aspect, embodiments disclosed herein relate to expanded articles that are prepared from polymer compositions that include an ethylene vinyl acetate (EVA) polymer at an amount ranging from 10 to 90 phr; an elastomeric EVA composition at an amount ranging from 10 to 90 phr; a plasticizer at an amount ranging from 5 to 40 phr; a blowing agent in an amount ranging from 2 to 10 phr; and a peroxide in an amount ranging from 0.3 to 4 phr.

In a further aspect, embodiments disclosed herein relate to methods that include: expanding an EVA-based polymer composition to form a foam having a density ranging from 0.04 $g/cm^3$ to 0.14 $g/cm^3$ and a hardness ranging from 5 to 35 Asker C in a single expansion foaming process.

Other aspects and advantages of the claimed subject matter will be apparent from the following description and the appended claims.

DETAILED DESCRIPTION

EVA is a copolymer of the polyolefin family of elastomers that comprises units derived from ethylene and vinyl acetate. EVA copolymers are generally produced by the polymerization of ethylene and vinyl acetate at high temperature and pressure. EVA copolymers provide materials that can be processed like other thermoplastics but may exhibit unique properties. As a result, EVA copolymers may be used in a wide range of applications, such as adhesives, films, expanded articles, etc.

The use of products derived from natural sources, as opposed to those obtained from fossil sources, has increasingly been widely preferred as an effective means of reducing the increase in atmospheric carbon dioxide concentration, therefore effectively limiting the expansion of the greenhouse effect. Products thus obtained from natural raw materials have a difference, relative to fossil sourced products, in their renewable carbon contents. This renewable carbon content can be certified by the methodology described in ASTM D 6866-18, "Standard Test Methods for Determining the Biobased Content of Solid, Liquid, and Gaseous Samples Using Radiocarbon Analysis". Products obtained from renewable natural raw materials have the additional property of being able to be incinerated at the end of their life cycle and only producing $CO_2$ of a non-fossil origin.

Generally, EVA-derived materials are not able to provide the requisite combination of properties, such as density and hardness, to be used for applications, such as mattresses and bras, that require exceptional softness. However, the polymer compositions, and articles therefrom, of some embodiments of the present disclosure possess superior properties to traditional materials and are able to be used in such applications.

Uniquely, the polymer compositions in accordance with one or more embodiments of the present disclosure are able to provide such properties after only a single-expansion foaming stage.

Polymer Compositions

Polymer compositions in accordance with the present disclosure may include an EVA polymer in an amount that ranges from a lower limit selected from one of 10 parts per hundred resin (phr), 12 phr, 15 phr, 20 phr, 25 phr, and 30 phr to an upper limit selected from one of 35 phr, 50 phr, 60 phr, 70 phr, 80 phr, 90 phr, and 100 phr, where any lower limit can be used with any upper limit. Polymer compositions of particular embodiments in accordance with the present disclosure may comprise an EVA polymer in an amount ranging from 10 to 90 phr.

Polymer compositions in accordance with the present disclosure may further include an elastomeric EVA composition in an amount that ranges from a lower limit selected from one of 10 parts per hundred resin (phr), 12 phr, 15 phr, 20 phr, 25 phr, and 30 phr to an upper limit selected from one of 35 phr, 50 phr, 60 phr, 70 phr, 80 phr, 90 phr, and 100 phr, where any lower limit can be used with any upper limit. Polymer compositions of particular embodiments in accordance with the present disclosure may comprise an EVA polymer in an amount ranging from 10 to 90 phr.

In one or more embodiments, polymer compositions in accordance with the present disclosure may also contain one or more plasticizers in an amount ranging from 5 to 40 phr. In one or more embodiments, the plasticizer may have a lower limit of any of 5, 7, 10, 12, and 15 phr, and an upper limit of any of 20, 22, 25, 30, 35 and 40 phr, where any lower limit may be used in combination with any upper limit.

In one or more embodiments, polymer compositions in accordance with the present disclosure may further contain one or more blowing accelerators at a parts per hundred resin (phr) that ranges from a lower limit selected from one of 0.01 phr, 0.1 phr, 0.25 phr, 0.5 phr, 1 phr, 2 phr, and 2.5 phr, to an upper limit selected from one of 1.5 phr, 2 phr, 2.5 phr, 3 phr, 3.5 phr, 4 phr, 4.5 phr and 5 phr, where any lower limit can be used with any upper limit.

In one or more embodiments, polymer compositions in accordance with the present disclosure may contain one or more blowing agents at a parts per hundred resin (phr) that ranges from a lower limit selected from one of 1 phr, 1.5 phr, 2 phr, 3 phr, 4 phr, and 5 phr to an upper limit selected from one of 4 phr, 5 phr, 6 phr, 7 phr, 8 phr, 9 phr, and 10 phr, where any lower limit may be used with any upper limit. In some embodiments, the polymer compositions may contain the one or more blowing agents in a total amount ranging from 2 to 10 phr. In particular embodiments, the polymer compositions may contain the one or more blowing agents in a total amount ranging from 5 to 8 phr. Polymer compositions in accordance with some embodiments of the present disclosure may comprise the one or more blowing agents in an amount that is sufficient to achieve an expansion of 110% or more, 120% or more, or 130% or more.

In one or more embodiments, polymer compositions in accordance with the present disclosure may contain one or more peroxide agents in an amount that ranges from a lower limit selected from one of 0.3 phr, 0.5 phr, 1 phr, 1.5 phr, and 2 phr, to an upper limit selected from one of 2 phr, 2.5 phr, 3 phr, 3.5 phr, and 4 phr, where any lower limit can be used with any upper limit. It may be envisioned that the concentration of the peroxide agent may be more or less depending on the application of the final material.

Polymer compositions in accordance with the present disclosure may further include one or more natural rubbers in an amount that ranges from a lower limit selected from one of 1 phr, 5 phr, 7 phr, and 10 phr to an upper limit selected from one of 10 phr, 12 phr, 15 phr, 17 phr, and 20 phr, where any lower limit can be used with any upper limit. Polymer compositions of particular embodiments in accordance with the present disclosure may comprise a natural rubber in an amount ranging from 5 to 20 phr.

In one or more embodiments, polymer compositions in accordance with the present disclosure may optionally contain one or more crosslinking co-agent in an amount that ranges from a lower limit selected from one of 0.01 phr, 0.25 phr, 0.5 phr, 1 phr to an upper limit selected from one of 1.5 phr, 2 phr, and 3 phr, where any lower limit may be paired with any upper limit.

In one or more embodiments, polymer compositions in accordance with the present disclosure may optionally contain a percent by weight of the total composition (wt %) of one or more fillers that ranges from a lower limit selected from one of 0.02 wt %, 0.05 wt %, 1.0 wt %, 5.0 wt %, 10.0 wt %, 15.0 wt %, and 20.0 wt %, to an upper limit selected from one of 25.0 wt %, 30.0 wt %, 40.0 wt %, 50.0 wt %, 60.0 wt %, and 70.0 wt %, where any lower limit can be used with any upper limit.

Eva Polymers

The EVA polymers of the polymer compositions in accordance with one or more embodiments may be prepared, and have properties, as disclosed in U.S. patent application Ser. No. 16/385,767, which is incorporated herein in its entirety. In some embodiments, the EVA may be derived from fossil (petrochemical) or renewable sources. While embodiments using bio-based EVA may have environmental advantages, one of ordinary skill in the art, upon reading this disclosure, would appreciate that the soft properties achieved within a single expansion stage apply equally to biobased and petrochemical EVAs, and thus, the present disclosure applies equally to EVA derived from both carbon sources.

The EVA polymers of one or more embodiments may have an ethylene content that ranges from a lower limit selected from one of 5 wt %, 25 wt %, 40 wt %, 60 wt %, 66 wt %, and 72 wt %, to an upper limit selected from one of 80 wt %, 85 wt %, 88 wt %, 92 wt %, and 95 wt %, relative to the weight of the EVA polymer, where any lower limit may be paired with any upper limit. Further, of this total amount of ethylene of one or more embodiments, it is understood that at least a portion of that ethylene may optionally be based on a renewable carbon source, as discussed below.

In one or more embodiments, polymer compositions in accordance with the present disclosure may include EVA polymers that have various ratios of ethylene and vinyl acetate, in addition to including one or more optional additional comonomers. Polymer compositions in accordance with the present disclosure may include an EVA polymer containing a percent by weight of vinyl acetate content, as determined by ASTM D5594, that ranges from a lower limit selected from one of 5 wt %, 8 wt %, 12 wt %, 15 wt %, 20 wt % to an upper limit selected from 25 wt %, 30 wt %, 35 wt %, 40 wt %, 60 wt %, 75 wt %, or 95 wt %, relative to the weight of the EVA polymer, where any lower limit may be paired with any upper limit. Further, of this total amount of vinyl acetate, it is understood that at least a portion of that vinyl acetate may optionally be based on a renewable carbon source, discussed below.

Polymer compositions in accordance with the present disclosure may include an EVA polymer, wherein the number average molecular weight (Mn) in kilodaltons (kDa) of the EVA polymer ranges from a lower limit selected from one of 5 kDa, 10 kDa, 20 kDa and 25 kDa to an upper limit selected from one of 30 kDa, 35 kDa, 40 kDa and 50 kDa, where any lower limit may be paired with any upper limit.

Polymer compositions in accordance with the present disclosure may include an EVA polymer, wherein the weight average molecular weight (Mw) in kilodaltons (kDa) of the EVA polymer ranges from a lower limit selected from one of 25 kDa, 50 kDa, 70 kDa, 90 kDa and 110 kDa to an upper limit selected from one of 120 kDa, 140 kDa, 150 kDa and 180 kDa, where any lower limit may be paired with any upper limit.

Polymer compositions in accordance with the present disclosure may include an EVA polymer, wherein the dispersity (Mw/Mn) of the EVA polymer ranges from a lower limit selected from one of 1.0, 1.5, 3.0 and 4.0 to an upper limit selected from one of 5.0, 6.0, 7.0 and 8.0, where any lower limit may be paired with any upper limit.

The molecular weight properties may be measured by GPC (Gel Permeation Chromatography) experiments. Such experiments may be coupled with triple detection, such as with an infrared detector IR5, a four-bridge capillary viscometer (PolymerChar) and an eight-angle light scattering detector (Wyatt). A set of 4 mixed bed, 13 μm columns (Tosoh) may be used at a temperature of 140° C. The experiments may use a concentration of 1 mg/mL, a flow rate of 1 mL/min, a dissolution temperature and time of 160° C. and 90 minutes, respectively, an injection volume of 200 μL, and a solvent of trichlorium benzene stabilized with 100 ppm of BHT.

Polymer compositions in accordance with the present disclosure may include an EVA polymer, where the EVA polymer exhibits a melt index as determined by ASTM D1238 that may range from a lower limit selected from one of 0.1, 1, 2, 5, 10, 20, of 50 to an upper limit selected from one of 50, 100, 200, 300, or 400 g/10 min measured with a load of 2.16 kg at 190° C., where any lower limit may be paired with any upper limit.

Polymer compositions in accordance with the present disclosure may include an EVA polymer, where the density of the EVA polymer, as determined by ASTM D792, may range from a lower limit selected from one of 0.91, 0.95, 0.97, or 1.1 g/cm$^3$ to an upper limit selected from one of 1.1, 1.5, 1.9, 1.21 or 1.25 g/cm$^3$, where any lower limit may be paired with any upper limit.

Polymer compositions in accordance with the present disclosure may include an EVA polymer, where copolymer exhibits a Shore A hardness as determined by ASTM D2240 that may range from a lower limit of any of 20, 30, 40, 50, 60, 65, 70, 75, or 80 to an upper limit of 60, 70, 75, 80, 100 Shore A, where any lower limit may be paired with any upper limit.

Polymer compositions in accordance with the present disclosure may include an EVA polymer, where copolymer exhibits a Vicat Softening Temperature as determined by ASTM D1525 Method A50 that may range from a lower limit of any of 35 40, 45, 50, or 55 to an upper limit of any of 65, 70, 75, 85, or 90° C., where any lower limit may be paired with any upper limit.

Polymer compositions in accordance with the present disclosure may include an EVA polymer, where the copolymer exhibits a Mooney viscosity ML (1+4) at 100° C. as determined by ASTM D 1646 in the range of 15 to 50 MU. Such Mooney viscosity may be achieved when the vinyl acetate contact is greater than 50% of the copolymer.

As mentioned, it is also envisioned that the EVA copolymer of the present disclosure may also contain one or more additional comonomers, by reacting an EVA polymer resin, prepolymer, or EVA monomers with one or more additional comonomers, including but not limited to one or more polar monomers, such as those of the type described in PCT/BR2017/050398, which is herein incorporated by reference in its entirety.

In particular embodiments, the EVA polymers may be HM728, 3019PE, 8019PE, PN2021, HM150, SVT2180, and combinations thereof, which are commercially available from Braskem.

Elastomeric EVA Compositions

The elastomeric EVA compositions may be prepared from (A) an EVA copolymer (optionally biobased), (B) an ethylene alpha-olefin copolymer, (C) polyorganosiloxane, (D) a plasticizer, and (E) a rubber. Elastomeric EVA compositions may be prepared, and possess properties, as disclosed in U.S. patent application Ser. No. 16/385,918, which is incorporated herein in its entirety. In some embodiments, the EVA can be derived from fossil (petrochemical) or renewable sources. The major components of the elastomeric EVA compositions of the present disclosure as well as their respective properties are detailed below.

In some embodiments, elastomeric EVA compositions may be VA4018R, SVT2145R, VA1518A, VA2510A, and combinations thereof, which are commercially available from Braskem.

(A) EVA Copolymer

Elastomeric EVA compositions in accordance with one or more embodiments may incorporate one or more ethylene-vinyl acetate (EVA) copolymers prepared by the copolymerization of ethylene and vinyl acetate. In some embodiments, the EVA copolymer can be derived from fossil or renewable sources such as biobased EVA. Biobased EVA is an EVA wherein at least one of ethylene and/or vinyl acetate monomers are derived from renewable sources, such as ethylene derived from biobased ethanol.

Polymer compositions in accordance with the present disclosure may include an EVA copolymer, wherein the percent by weight of ethylene in the EVA polymer ranges from a lower limit selected from one of 60 wt %, 66 wt %, and 72 wt %, to an upper limit selected from one of 82 wt %, 88 wt %, 92 wt %, and 95 wt %, where any lower limit may be paired with any upper limit. Further, of this total amount of ethylene, it is understood that at least a portion of that ethylene may be based on a renewable carbon source.

Polymer compositions in accordance with the present disclosure may include EVA copolymers incorporating various ratios of ethylene and vinyl acetate. Polymer compositions in accordance with the present disclosure may include an EVA copolymer, wherein the percent by weight of vinyl acetate in the copolymer, as determined by ASTM D5594, ranges from a lower limit selected from one of 5 wt %, 8 wt %, 12 wt %, and 18 wt % to an upper limit selected from 28 wt %, 33 wt %, and 40 wt %, where any lower limit may be paired with any upper limit. Further, of this total amount of vinyl acetate, it is understood that at least a portion of that vinyl acetate may be based on a renewable carbon source.

Polymer compositions in accordance with the present disclosure may include an EVA copolymer, wherein the number average molecular weight (Mn) in kilodaltons (kDa) of the EVA copolymer ranges from a lower limit selected from one of 5 kDa, 10 kDa, 20 kDa and 25 kDa to an upper limit selected from one of 30 kDa, 35 kDa, 40 kDa and 50 kDa, where any lower limit may be paired with any upper limit.

Polymer compositions in accordance with the present disclosure may include an EVA copolymer, wherein the weight average molecular weight (Mw) in kilodaltons (kDa) of the EVA copolymer ranges from a lower limit selected from one of 25 kDa, 50 kDa, 70 kDa, 90 kDa and 110 kDa to an upper limit selected from one of 120 kDa, 140 kDa, 150 kDa and 180 kDa, where any lower limit may be paired with any upper limit.

Polymer compositions in accordance with the present disclosure may include an EVA copolymer, wherein the dispersity (Mw/Mn) of the EVA copolymer ranges from a lower limit selected from one of 1.0, 1.5, 3.0 and 4.0 to an upper limit selected from one of 5.0, 6.0, 7.0 and 8.0, where any lower limit may be paired with any upper limit.

The molecular weight properties may be measured by GPC (Gel Permeation Chromatography) experiments. Such experiments may be coupled with triple detection, such as with an infrared detector IR5 and a four-bridge capillary viscometer (PolymerChar) and an eight-angle light scattering detector (Wyatt). A set of 4 mixed bed, 13 µm columns (Tosoh) may be used at a temperature of 140° C. The experiments may use a concentration of 1 mg/mL, a flow rate of 1 mL/min, a dissolution temperature and time of 160° C. and 90 minutes, respectively, an injection volume of 200 µL, and a solvent of trichlorium benzene stabilized with 100 ppm of BHT.

Elastomeric EVA compositions in accordance with the present disclosure may contain an ethylene vinyl acetate copolymer at a percent by weight (wt %) of the composition that ranges from a lower limit of 20 wt %, 30 wt %, 40 wt %, or 50 wt %, to an upper limit of 60 wt %, 70 wt %, 80 wt %, or 90 wt %, where any lower limit may be paired with any upper limit.

In particular embodiments, the EVA copolymer of the elastomeric EVA composition may be HM728, 3019PE, 8019PE, PN2021, HM150 and combinations thereof, which are commercially available by Braskem. In some embodiments, the EVA can be derived from fossil or renewable sources such as biobased EVA. Bio-based EVA is discussed below.

(B) Ethylene Alpha-Olefin Copolymer

Elastomeric EVA compositions in accordance with the present disclosure may incorporate one or more copolymers prepared from the polymerization of ethylene and a C3 to C20 alpha-olefin.

Ethylene alpha-olefin copolymers in accordance with the present disclosure may have a hardness determined in accordance with ASTM D2240 in a range having a lower limit selected from any of 10 Shore A, 15 Shore A, and 20 Shore A, to an upper limit selected from any of 70 Shore A, 75 Shore A, and 80 Shore A, where any lower limit may be paired with any upper limit.

Ethylene alpha-olefin copolymer in accordance with the present disclosure may have a density determined according to ASTM D792 in a range having a lower limit selected from any of 0.80 g/cm$^3$, 0.85 g/cm$^3$, and 0.88 g/cm$^3$, to an upper limit selected from any of 0.89 g/cm$^3$, 0.90 g/cm$^3$, and 0.95 g/cm$^3$, where any lower limit may be paired with any upper limit.

Ethylene alpha-olefin copolymer in accordance with the present disclosure may have a melt flow index (MFI) at 190° C. and 2.16 kg as determined according to ASTM D1238 in a range having a lower limit selected from any of 0.01 g/10 min, 0.05 g/10 min, and 0.1 g/10 min, 0.5 g/10 min, 1 g/10 min, 5 g/10 min and 10 g/10 min to an upper limit selected from any of 70 g/10 min, 75 g/10 min, and 100 g/10 min, where any lower limit may be paired with any upper limit.

Elastomeric EVA compositions in accordance with the present disclosure may contain an ethylene alpha-olefin copolymer at a percent by weight (wt %) of the composition that ranges from a lower limit of 5 wt % or 10 wt %, to an upper limit of 30 wt % or 60 wt %, where any lower limit may be paired with any upper limit.

(C) Polyorganosiloxane

Elastomeric EVA compositions in accordance with the present disclosure may incorporate a polyorganosiloxane. In one or more embodiments, suitable polyorganosiloxanes include a linear chain, branched, or three-dimensional structure, wherein the side groups can include one or more of methyl, ethyl, propyl groups, vinyl, phenyl, hydrogen, amino, epoxy, or halogen substituents. The terminal groups of the polyorganosiloxane may include hydroxyl groups, alkoxy groups, trimethylsilyl, dimethyldiphenylsilyl, and the like. Polyorganosiloxanes in accordance with the present disclosure may include one or more of dimethylpolysiloxane, methylpolysiloxane, and the like.

Elastomeric EVA compositions in accordance with the present disclosure may contain a polyorganosiloxane having a viscosity measured at 25° C. that ranges from a lower limit of 20 cP or 40 cP, to an upper limit of 700,000 cP or 900,000 cP, where any lower limit may be paired with any upper limit.

Elastomeric EVA compositions in accordance with the present disclosure may contain a polyorganosiloxane at a percent by weight (wt %) of the composition that ranges from a lower limit of 0.1 wt % or 0.5 wt %, to an upper limit of 5 wt % or 10 wt %, where any lower limit may be paired with any upper limit.

(D) Plasticizer

Elastomeric EVA compositions in accordance may incorporate a plasticizer to improve the processability and adjust the hardness of the elastomeric EVA. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

Elastomeric EVA compositions in accordance with the present disclosure may contain a plasticizer at a percent by weight (wt %) of the composition that ranges from a lower limit of 0.5 wt %, 1 wt %, or 2 wt %, to an upper limit of 10 wt %, 15 wt %, or 20 wt %, where any lower limit may be paired with any upper limit.

(E) Rubber

Elastomeric EVA compositions in accordance with one or more embodiments of the present disclosure may incorporate a rubber component to, for example, increase the rubbery touch and increase the coefficient of friction, depending on the end application. Rubbers in accordance with the present disclosure may include one or more of natural rubber, poly-isoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isotubylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A, and 55 Shore A, where any lower limit may be paired with any upper limit.

Elastomeric EVA compositions in accordance with the present disclosure may contain a rubber at a percent by weight (wt %) of the composition that ranges from a lower limit of 0.5 wt % or 1 wt %, to an upper limit of 20 wt % or 40 wt %, where any lower limit may be paired with any upper limit.

In one or more embodiments, the elastomeric EVA composition may have a melt index measured at 190° C. and with a load of 2.16 kg as determined according to ASTM D1238 in a range having a lower limit selected from any of 1 g/10 min, 2 g/10 min, 3 g/10 min, and 4 g/10 min, to an upper limit selected from any of 10 g/10 min, 15 g/10 min, 20 g/10 min, 25 g/10 min, and, where any lower limit may be paired with any upper limit, where any lower limit may be paired with any upper limit.

In one or more embodiments, the elastomeric EVA composition may have a density determined according to ASTM D792 in a range having a lower limit selected from any of 0.92 g/cm$^3$, 0.93 g/cm$^3$, and 0.94 g/cm$^3$, to an upper limit selected from any of 0.94 g/cm$^3$, 0.95 g/cm$^3$, and 0.96 g/cm$^3$, where any lower limit may be paired with any upper limit.

In one or more embodiments, the elastomeric EVA composition exhibits a Shore A hardness as determined by ASTM D2240 that may range from a lower limit of any of 40, 50, or 60 to an upper limit of 70, 80, or 90 Shore A, where any lower limit may be paired with any upper limit.

Elastomeric EVA compositions may be prepared by combining components (A)-(E) at a temperature in the range of 90° C. and 180° C. and for a time in the range of 1 to 10 minutes. In one or more embodiments, components of the elastomeric EVA composition may be combined at a temperature ranging from a lower limit of 70, 80, 90, 100, or 110° C. to an upper limit of 120, 130, 140, 150, 160, 170, 180 or 190° C., where any lower limit may be paired with any upper limit. The components may be combined for a time that ranges from a lower limit of 1, 2, 3, 4, or 5 minutes to an upper limit of 5, 6, 7, 8, 9, 10, 12, 15, or 20 minutes, where any upper limit may be paired with any lower limit. The mixing of components (A)-(E) may be performed prior to combination with the other components to produce a polymer composition in accordance with the present disclosure. For example, the components of the elastomeric EVA composition may be combined and processed into a polymer resin prior to a second step of combining with an EVA polymer, plasticizer, blowing agent, and/or peroxide agent. The elastomeric EVA compositions in accordance with one or more embodiments of the present disclosure may be prepared by mixing in conventional kneaders, banbury mixers, mixing rollers, twin screw extruders, and the like, under conventional EVA processing conditions Bio-Based Carbon Content In polymer compositions of one or more embodiments, one or more of the EVA polymer and the elastomeric EVA composition may contain at least a portion of bio-based carbon. In embodiments where both the EVA polymer and the elastomeric EVA composition contain bio-based carbon, their respective bio-based carbon contents may be the same as, or different from, each other.

Specifically, in one or more embodiments, one or more of the EVA polymer and the elastomeric EVA composition may exhibit a bio-based carbon content, as determined by ASTM D6866-18 Method B, of at least 5%. Some embodiments may include at least 10%, 20%, 40%, 50%, 60%, 80%, or 100% bio-based carbon. The total bio-based or renewable carbon in the EVA polymer and/or the elastomeric EVA composition may be contributed from a bio-based ethylene and/or a bio-based vinyl acetate.

For example, in one or more embodiments, the renewable source of carbon may be one or more plant materials selected from the group consisting of sugar cane and sugar beet, maple, date palm, sugar palm, sorghum, American agave, corn, wheat, barley, sorghum, rice, potato, cassava, sweet potato, algae, fruit, materials comprising cellulose, wine, materials comprising hemicelluloses, materials comprising lignin, wood, straw, sugarcane bagasse, sugarcane leaves, corn stover, wood residues, paper, and combinations thereof.

In one or more embodiments, bio-based ethylene may be obtained by fermenting a renewable source of carbon to produce ethanol, which may be subsequently dehydrated to produce ethylene. Further, it is also understood that the fermenting produces, in addition to the ethanol, byproducts of higher alcohols. If the higher alcohol byproducts are present during the dehydration, then higher alkene impurities may be formed alongside the ethanol. Thus, in one or more embodiments, the ethanol may be purified prior to dehydration to remove the higher alcohol byproducts while in other embodiments, the ethylene may be purified to remove the higher alkene impurities after dehydration.

Thus, biologically sourced ethanol, known as bio-ethanol, may be obtained by the fermentation of sugars derived from cultures such as that of sugar cane and beets, or from hydrolyzed starch, which is, in turn, associated with other cultures such as corn. It is also envisioned that the bio-based ethylene may be obtained from hydrolysis-based products of cellulose and hemi-cellulose, which can be found in many agricultural by-products, such as straw and sugar cane husks. This fermentation is carried out in the presence of varied microorganisms, the most important of such being the yeast *Saccharomyces cerevisiae*. The ethanol resulting therefrom may be converted into ethylene by means of a catalytic reaction at temperatures usually above 300° C. A large variety of catalysts can be used for this purpose, such as high specific surface area gamma-alumina. Other examples include the teachings described in U.S. Pat. Nos. 9,181,143 and 4,396,789, which are herein incorporated by reference in their entirety.

Bio-based vinyl acetate, on the other hand, may also be used in one of more embodiments of the present disclosure. Bio-based vinyl acetate may be produced by producing acetic acid by oxidation of ethanol (which may be formed as described above) followed by reaction of ethylene and acetic acid to acyloxylate the ethylene and arrive at vinyl acetate. Further, it is understood that the ethylene reacted with the acetic acid may also be formed from a renewable source as described above.

An exemplary route of obtaining a bio-based vinyl acetate may include, initially, the fermentation and optional purification of a renewable starting material, including those described above, to produce at least one alcohol (either ethanol or a mixture of alcohols including ethanol). The alcohol may be separated into two parts, where the first part is introduced into a first reactor and the second part may be introduced into a second reactor. In the first reactor, the alcohol may be dehydrated in order to produce an alkene (ethylene or a mixture of alkenes including ethylene, depending on whether a purification followed the fermentation) followed by optional purification to obtain ethylene. One of ordinary skill in the art may appreciate that if the purification occurs prior to dehydration, then it need not occur after dehydration, and vice versa. In the second reactor, the alcohol may be oxidized in order to obtain acetic acid, which may optionally be purified. In a third reactor, the ethylene produced in the first reactor and the acetic acid produced in the second reactor may be combined and reacted to acyloxylate the ethylene and form vinyl acetate, which may be subsequently isolated and optionally purified. Additional details about oxidation of ethanol to form acetic acid may be found in U.S. Pat. No. 5,840,971 and Selective catalytic oxidation of ethanol to acetic acid on dispersed Mo—V-Nb mixed oxides. Li X, Iglesia E. Chemistry. 2007; 13(33):9324-30.

However, the present disclosure is not so limited in terms of the route of forming acetic acid. Rather, it is also envisioned, that acetic acid may be obtained from a fatty acid, as described in "The Production of Vinyl Acetate Monomer as a Co-Product from the Non-Catalytic Cracking of Soybean Oil", Benjamin Jones, Michael Linnen, Brian Tande and Wayne Seames, Processes, 2015, 3, 61-9-633. Further, the production of acetic acid from fermentation performed by acetogenic bacteria, as described in "Acetic acid bacteria: A group of bacteria with versatile biotechnological applications", Saichana N, Matsushita K, Adachi O, Frébort I, Frebortova J. Biotechnol Adv. 2015 Nov. 1; 33(6 Pt 2):1260-71 and Biotechnological applications of acetic acid bacteria. Raspor P, Goranovic D. Crit Rev Biotechnol. 2008; 28(2):101-24. Further, it is also understood that the production of ethylene used to produce vinyl acetate may also be used to provide the ethylene that is subsequently reacted with the vinyl acetate to form the EVA copolymer of the present disclosure. Thus, for example, the amount of ethanol that is fed to the first and second reactors, respectively, may be vary depending on the relative amounts of ethylene and vinyl acetate being polymerized.

Plasticizers

Polymer compositions containing EVA may have their softness enhanced through the addition of plasticizers.

In one or more embodiments, polymer compositions in accordance with the present disclosure may incorporate one or more plasticizers to adjust the physical properties and processability of the composition. In some embodiments, plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3gh), tetra-ethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers. In particular embodiments, one of the one or more plasticizers may be mineral oil.

Blowing Accelerators

Polymer compositions in accordance with the present disclosure may include one or more blowing accelerators (also known as kickers) that enhance or initiate the action of a blowing agent by lower the associated activation temperature. For example, blowing accelerators may be used if the selected blowing agent reacts or decomposes at temperatures higher than 170° C., such as 220° C. or more, where the surrounding polymer would be degraded if heated to the activation temperature. Blowing accelerators may include any suitable blowing accelerator capable of activating the selected blowing agent. In one or more embodiments, suitable blowing accelerators may include cadmium salts, cadmium-zinc salts, lead salts, lead-zinc salts, barium salts, barium-zinc (Ba—Zn) salts, zinc oxide, titanium dioxide, triethanolamine, diphenylamine, sulfonated aromatic acids and their salts, and the like. Polymer compositions in accordance with particular embodiments of the present disclosure may include zinc oxide as one of the one or more blowing accelerators. In some embodiments, blowing accelerators may be included in the elastomeric EVA compositions in addition to, or instead of, the polymer composition itself.

Blowing Agents

Polymer compositions in accordance with the present disclosure may include one or more blowing agents to produce expanded polymer compositions and foams. Blowing agents may include solid, liquid, or gaseous blowing agents. In embodiments utilizing solid blowing agents, blowing agents may be combined with a polymer composition as a powder or granulate. In some embodiments, blowing agents may be included in the elastomeric EVA compositions in addition to, or instead of, the polymer composition itself.

Blowing agents in accordance with the present disclosure may include chemical blowing agents that decompose at polymer processing temperatures, releasing the blowing gases such as N2, CO, $CO_2$, and the like. Examples of chemical blowing agents may include organic blowing agents, including hydrazines such as toluenesulfonyl hydrazine, hydrazides such as oxydibenzenesulfonyl hydrazide, diphenyl oxide-4,4'-disulfonic acid hydrazide, and the like, nitrates, azo compounds such as azodicarbonamide, cyanovaleric acid, azobis(isobutyronitrile), and N-nitroso compounds and other nitrogen-based materials, and other compounds known in the art.

Inorganic chemical blowing agents may include carbonates such as sodium hydrogen carbonate (sodium bicarbonate), sodium carbonate, potassium bicarbonate, potassium carbonate, ammonium carbonate, and the like, which may be used alone or combined with weak organic acids such as citric acid, lactic acid, or acetic acid.

Peroxides

Polymer compositions in accordance with the present disclosure may include one or more peroxide agents capable of generating free radicals during polymer processing. In one or more embodiments, peroxide agents may include bifunctional peroxides such as benzoyl peroxide; dicumyl peroxide; di-tert-butyl peroxide; 00-Tert-amyl-0-2-ethylhexyl monoperoxycarbonate; tert-butyl cumyl peroxide; tert-butyl 3,5,5-trimethylhexanoate peroxide; tert-butyl peroxybenzoate; 2-ethylhexyl carbonate tert-butyl peroxide; 2,5-dimethyl-2,5-di (tert-butylperoxide) hexane; 1,1-di (tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di (tert-butylperoxide) valerate; di (2,4-dichlorobenzoyl) peroxide; di(4-methylbenzoyl) peroxide; peroxide di(tert-butylperoxyisopropyl) benzene; and the like. In some embodiments, peroxide agents may be included in the elastomeric EVA compositions in addition to, or instead of, the polymer composition itself.

Peroxide agents may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, butyl-peroxy-2-ethyl-hexanoate, tert-butyl peroxypivalate, tertiary butyl peroxyneodecanoate, t-butyl-peroxy-benzoate, t-butyl-peroxy-2-ethyl-hexanoate, 4-methyl-4-(t-amylperoxy)-2-pentanol,4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy) hexane, 2,5-dimethyl-2,5-di(t-butylperoxy)hexyne-3,2,5-dimethyl-2,5-di(t-amylperoxy)hexyne-3,2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris (cumylperoxyisopropyl)benzene, di[1,3-dimethyl-3-(t-butylperoxy)butyl]carbonate, di[1,3-dimethyl-3-(t-amylperoxy) butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl] benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl) peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl) 1-methylethyl]carbamate, 1,3-dimethyl-3-(t-amylperoxy)butyl N-[1-{3(1-methylethenyl)-phenyl}-1-methylethyl]carbamate, 1,3-dimethyl-3-(cumylperoxy))butyl N-[1-{3-(1-methylethenyl)-phenyl}-1-methylethyl]carbamate, 1, 1-di(t-butylperoxy)-3,3,5-trimethylcyclohexane, 1, 1-di(t-butylperoxy)cyclohexane, n-butyl 4,4-di(t-amylperoxy)valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6, 9,9-hexamethyl-1,2,4,5-tetraoxacyclononane, 2,5-dimethyl-2,5-di(benzoylperoxy)hexane, t-butyl perbenzoate, t-butylperoxy acetate,t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1,1,1-tris[2-(t-butylperoxy-carbonyloxy)ethoxymethyl]propane, 1,1,1-tris [2-(t-amylperoxy-carbonyloxy)ethoxymethyl]propane, 1,1, 1-tris[2-(cumylperoxy-cabonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

Crosslinking Co-Agents

It is also envisioned that crosslinking co-agent may be combined in the polymer composition. Crosslinking co-agents create additional reactive sites for crosslinking, allowing the degree of polymer crosslinking to be considerably increased from that normally obtained solely by the addition of peroxide. Generally, co-agents increase the rate of crosslinking. In one or more embodiments, the crosslinking co-agents may include Triallyl isocyanurate (TAIL), trimethylolpropane-tris-methacrylate (TRIM), triallyl cyanurate (TAC) and combinations thereof.

Fillers and Additives

Polymer compositions in accordance with the present disclosure may include fillers and additives that modify various physical and chemical properties when added to the polymer composition during blending that include one or more polymer additives such as processing aids, lubricants, antistatic agents, clarifying agents, nucleating agents, beta-nucleating agents, slipping agents, antioxidants, compatibilizers, antacids, light stabilizers such as HALS, IR absorbers, whitening agents, inorganic fillers, organic and/or inorganic dyes, anti-blocking agents, processing aids, flame-retardants, plasticizers, biocides, adhesion-promoting agents, metal oxides, mineral fillers, glidants, oils, antioxidants, antiozonants, accelerators, and vulcanizing agents. In some embodiments, fillers and/or additives may be included in the elastomeric EVA compositions in addition to, or instead of, the polymer composition itself.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS), or recycled EVA. As defined herein, recycled EVA may be derived from regrind materials that have undergone at least one processing method such as molding or extrusion and the subsequent sprue, runners, flash, rejected parts, and the like, are ground or chopped.

Properties of Polymer Compositions

Polymer compositions in accordance with one or more embodiments of the present disclosure may exhibit a bio-based carbon content, as determined by ASTM D6866-18 Method B, of at least 5%. In some embodiments, polymer compositions may contain at least 10%, 20%, 40%, 50%, 60%, 80%, 90%, or 99% bio-based carbon. As discussed above, the total bio-based or renewable carbon in the polymer composition may be contributed from one or more of the EVA polymer and the elastomeric EVA composition.

In one or more embodiments, polymer compositions in accordance with the present disclosure may be expanded and cured. Expanded polymer compositions in accordance with one or more embodiments of the present disclosure may have a density, in accordance ASTM D-792, ranging from a lower limit selected from any one of 0.02, 0.04, 0.06, and 0.08 g/cm$^3$, to an upper limit selected from one of 0.08, 0.10, 0.12 and 0.14 g/cm³, where any lower limit may be paired with any upper limit. Expanded polymer compositions in accordance with one or more embodiments of the present disclosure may have an expansion ratio of 110% or more, 120% or more, or 130% or more.

Expanded polymer compositions in accordance with one or more embodiments of the present disclosure may have an Asker C hardness as determined by ASTM D2240 that ranges from a lower limit of any of 5, 7, 10, 12, or 15 Asker C to an upper limit of any of 15, 18, 20, 25, 30, or 35 Asker C, where any lower limit can be paired with any upper limit. In other embodiments, expanded polymer compositions in accordance with the present disclosure may have an Asker C hardness that is 25 Asker C or less, 20 Asker C or less, 18 Asker C or less, or 15 Asker C or less.

Expanded polymer compositions in accordance with the present disclosure may have a rebound, as determined by ASTM D3574, that range from a lower limit selected from one of 20%, 30%, 35%, 40%, 45%, and 50% to an upper limit selected from one of 50%, 60%, 70%, 80% and 90%, where any lower limit may be paired with any upper limit. In particular embodiments, expanded polymer compositions may exhibit a rebound, as determined in accordance with ASTM D3574, that ranges from 30% to 80%.

Expanded polymer compositions in accordance with one or more embodiments of the present disclosure may have a shrinkage at 70° C. for 1 h using the PFI method (PFI "Testing and Research Institute for the Shoe Manufacturing Industry" in Pirmesens-Germany) that may be 6% or less, 5% or less, 4% or less, 3% or less, or 2% or less. In other embodiments, the expanded polymer composition may have a shrinkage that ranges from a lower limit selected from one of 0%, 0.01%, 0.1%, 1%, and 1.5%, to an upper limit selected from one of 1.5%, 2%, 3%, 4%, 5%, 6%, and 7%, where any lower limit may be paired with any upper limit. The PFI method may be used in the industry for shrinkage measurements and is detailed below:

Equipment:
oven with forced air circulation
pachymeter
ruler for marking of specimens or template
thickness gauge
Sample
Three specimens of dimensions of at least 100×100 mm should be evaluated of each sample.

Procedure

Figure 1:
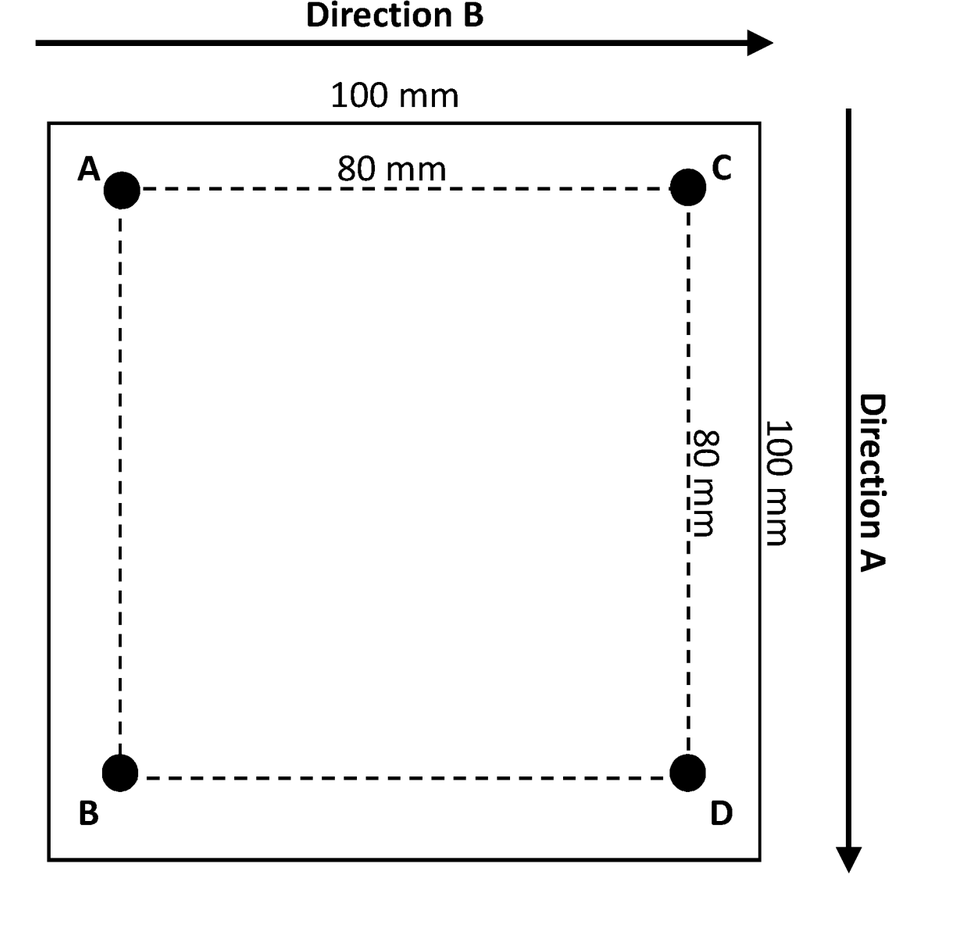
FIG. 1 depicts various points pertinent to the PFI method of determining article shrinkage according to one or more embodiments of the present disclosure.

The specimens may be conditioned at a temperature of 23±2° C. and a relative humidity of 50±5% for 1 hour. The approximate thickness of the specimens is measured. Using a ruler or template, the points A, B, C and D are marked on each of the specimens as shown in FIG. 1. The initial length ($C_i$) is measured with a pachymeter, to the nearest 0.01 mm, in direction A (segments A-B and C-D) and in the direction B (segments A-C and B-D). The specimens are then held at 70° C. for 1 hour in a forced air circulation oven. After the exposure period, the specimens are removed from the oven and conditioned at a temperature of 23±2° C. and a relative humidity of 50±5% for 60 minutes.

The final length ($C_f$) is measured with a caliper, to the nearest 0.01 mm, in direction A (segments A-B and C-D) and direction B (segments A-C and B-D).

The average initial length ($C_{im}$) is calculated in the A direction as the average of the A-B and C-D segments and in the B direction as the average of the A-C and B-D segments for each of the specimens.

The average final length ($C_{fm}$) is calculated in the A direction as the average of the A-B and C-D segments and the B direction as the average of the A-C and B-D segments for each of the specimens.

Results

The shrinkage of the expanded EVA is given by the following equation, expressed as a percentage to the nearest 0.1%.

$$\text{Shrinkage \%} = (C_{im} - C_{fm}) \times 100 / C_{im}$$

Where:
$C_{im}$=initial length average (mm); and
$C_{fm}$=final length average (mm)

The final EVA shrinkage result will be calculated for the directions A and B as the average of the shrinkage values calculated for each specimen.

The PFI recommends acceptable maximum values for shrinkage of expanded materials in directions A and B (FIG. 1) of 3% for materials with a density up to 0.6 g/cm³ and 2% for materials with a density above 0.6 g/cm³.

Methods

Polymer compositions in accordance with the present disclosure may be prepared in any conventional mixture device or means. In one or more embodiments, polymeric compositions may be prepared by mixture in conventional kneaders, banbury mixers, mixing rollers, twin screw extruders, and the like, in conventional EVA processing conditions and subsequently cured or cured and expanded in conventional expansion processes, such as injection molding or compression molding.

In one or more embodiments, polymer compositions in accordance with the present disclosure may include EVA polymers that are prepared in reactor by the polymerization of ethylene and vinyl acetate. In some embodiments, the ethylene and vinyl acetate are polymerized by high pressure radical polymerization, wherein peroxide agents act as polymerization initiators. In some embodiments, the ethylene, vinyl acetate, and peroxide agents are added at elevated pressure into an autoclave or tubular reactor at a temperature of between 80° C. and 300° C. and a pressure inside the reactor between 500 bar and 3000 bar in some embodiments, and a pressure between 1000 bar and 2600 bar in more specific embodiments. In other embodiments, the polymers may be produced by a solution polymerization process.

As mentioned, one or more free-radical producing agents, including any of those described above may be present during the polymerization. Further, it is also understood that upon being mixed with the other components forming the polymer composition, the polymer composition may also be cured by, for example, in the presence of peroxides, including those discussed above, and optionally, a crosslinking co-agent, also discussed above. For embodiments which include expanded compositions, the expanding and curing may be in the presence of a blowing agent and a peroxide agent, and optionally, a blowing accelerator or crosslinking co-agent. During any of such curing steps, in one or more embodiments, the curing may occur in full or partial presence of oxygen, such as described in WO201694161A1, which is incorporated by reference in its entirety.

The polymer composition may be extruded with an extruder that may provide for the injection of a gas, or when a chemical blowing agent is used, the blowing agent may be mixed with the polymer being fed into the extruder. Gas, either injected into the extruder or formed through thermal decomposition of a chemical blowing agent in the melting zone of the extruder. The gas (irrespective of the source of the gas) in the polymer forms into bubbles that distribute through the molten polymer. Upon eventual solidification of the molten polymer, the gas bubble result in a cell structure or foamed material. In particular embodiments, polymer compositions in accordance with the present disclosure may be expanded to form a foam in a single-expansion foaming process, and reaching the above described properties in such single-expansion foaming process.

Articles

Expanded polymer compositions in accordance with one or more embodiments of the present disclosure may be used for the production of a number of polymer articles used for a diverse array of end-uses, but especially those where softness is desired. Such applications may include bras, bedding, mattresses, pillows, upholstery, automotive seats, garments, shoes, foams, furniture, electro-electronic, automotive, packaging, mats, paperboards, sportive articles, toys, swimming accessories, educational games and articles, decorative panels, EVA balls, slippers, sponges, seats, cycling bib pads, protective covers, carpets, aprons and others.

Examples

In the following example, polymeric compositions formulations were prepared in a kneader model XSN-5 QUANZHOU YUCHENGSHENG MACHINE CO., LTD at a temperature of 105° C. and subsequently laminated in a cylinder (open-mix) and pressed and cured in a hydraulic press model LPB-100-AQ-EVA from Luxor Indústria de Máquinas Ltda at 175° C. for 7 min and expanded at different expansion rates to produce plaques, which were assayed to study various physical properties. The resulting polymeric composition formulations are shown in Table 1.

TABLE 1

| Polymer compositions formulations | | | |
|---|---|---|---|
| Material | C1 PHR | C2 PHR | C3 PHR |
| EVA polymer (SVT2180) | 60 | 56.1 | 52.8 |
| Elastomeric EVA composition (SVT 2145R) | 40 | 43.9 | 41.6 |
| Plasticizer (mineral oil) | 14 | 13.9 | 15.1 |
| Blowing Accelerator (Zinc Oxide) | 1.8 | 1.79 | 1.8 |
| Stearic Acid | 0.24 | 0.2 | 0.2 |
| Blowing Agent (azodicarbonamide) | 6 | 7.1 | 7.1 |
| Peroxide agent (bis-peroxide 40%) | 1.87 | 1.86 | 1.96 |
| Natural Rubber | — | — | 5.6 |
| Slip Agent | 0.6 | 0.6 | 0.6 |
| Total | 124.51 | 125.45 | 126.76 |

Samples were assayed for hardness (Asker C), density, and rebound and the results are shown in Table 2.

TABLE 2

| Properties of expanded polymer compositions | | | | |
|---|---|---|---|---|
| Properties | Unit | C1 | C2 | C3 |
| Expansion Rate | % | 143 | 144 | 144 |
| Hardness Asker C | Asker C | 17 | 15 | 14 |
| Density | g/cm³ | 0.06 | 0.05 | 0.05 |
| Rebound | % | 45 | 46 | 47 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An expanded polymer composition, comprising:
an ethylene vinyl acetate (EVA) copolymer at an amount ranging from 10 to 90 phr;
a blended elastomeric EVA composition at an amount ranging from 10 to 90 phr;
a plasticizer at an amount ranging from 5 to 40 phr;
a blowing agent in an amount ranging from 2 to 10 phr; and
a peroxide in an amount ranging from 0.3 to 4 phr,
wherein the expanded polymer composition exhibits a hardness as determined by ASTM D2240 in the range of 5 to less than 35 Asker C and a density as determined by ASTM D-792 within the range of 0.04 g/cm³ to 0.14 g/cm³.

2. The expanded polymer composition of claim 1, further comprising: a blowing accelerator in an amount ranging from 0.01 to 5 phr.

3. The expanded polymer composition of claim 1, further comprising: a natural rubber in an amount ranging from 5 phr to 20 phr.

4. The expanded polymer composition of claim 1, wherein the EVA copolymer comprises a vinyl acetate content ranging from 8 wt % and 40 wt %, based on the EVA polymer.

5. The expanded polymer composition of claim 1, wherein the blended elastomeric EVA composition comprises, relative to the weight of the elastomeric EVA composition:
(A) an EVA copolymer at a percent by weight in the range of 20 wt % to 90 wt %;
(B) an ethylene alpha-olefin copolymer at a percent by weight in the range of 5% to 60%;
(C) a polyorganosiloxane at a percent by weight in the range of 0.1 wt % to 10 wt %;
(D) a plasticizer at a percent by weight in the range of 0.5 wt % to 20 wt %; and
(E) a rubber at a percent by weight in the range of 0.5 wt % to 40 wt %.

6. The expanded polymer composition of claim 1, wherein the polymer composition exhibits a biobased carbon content as determined by ASTM D6866-18 Method B of at least 5%.

7. The expanded polymer composition of claim 1, wherein the expanded polymer composition has an expansion ratio of 120% or more.

8. The expanded polymer composition of claim 1, wherein the polymer composition exhibits a hardness as determined by ASTM D2240 in the range of 5 to 25 Asker C.

9. The expanded polymer composition of claim 1, wherein the polymer composition is an expanded polymer composition that exhibits a shrinkage according to the PFI method in the range of less than 3%.

10. The expanded polymer composition of claim 1, wherein the polymer composition is an expanded polymer composition that exhibits a rebound as determined by ASTM D3574 within the range of 30% to 80%.

11. An expanded article prepared from the composition of claim 1.

12. The expanded article of claim 11, wherein the expanded article is selected from upholstery, bedding, mattress, pillow, automotive seating, garments, and bras.

* * * * *